(12) United States Patent
Pollock et al.

(10) Patent No.: US 10,146,409 B2
(45) Date of Patent: Dec. 4, 2018

(54) COMPUTERIZED DYNAMIC SPLITTING OF INTERACTION ACROSS MULTIPLE CONTENT

(71) Applicant: Microsoft Technology Licensing, LLC, Redmond, WA (US)

(72) Inventors: Nathan Pollock, Seattle, WA (US); Lindsay Kubasik, Seattle, WA (US); Peter Benjamin Freiling, Seattle, WA (US); Nicolas Brun, Seattle, WA (US); Krishnan Menon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 333 days.

(21) Appl. No.: 14/473,560

(22) Filed: Aug. 29, 2014

(65) Prior Publication Data

US 2016/0062580 A1 Mar. 3, 2016

(51) Int. Cl.
  *G06F 3/0484* (2013.01)
  *G06F 3/0488* (2013.01)
  *G06F 3/0481* (2013.01)

(52) U.S. Cl.
  CPC .......... *G06F 3/0484* (2013.01); *G06F 3/0481* (2013.01); *G06F 3/0488* (2013.01); *G06F 3/04883* (2013.01)

(58) Field of Classification Search
  CPC ......... G06F 9/4443; G06F 8/34; G06F 3/0484
  See application file for complete search history.

(56) References Cited

U.S. PATENT DOCUMENTS 4,975,690 A * 12/1990 Torres .................. G06F 3/0481
                                                              715/212
7,088,374 B2   8/2006 David et al.
(Continued)

FOREIGN PATENT DOCUMENTS

| KR | 20100020311 | 2/2010 |
| KR | 20110037761 | 4/2011 |
| WO | WO2012166188 | 12/2012 |

OTHER PUBLICATIONS

The PCT Written Opinion of the International Preliminary Examining Authority dated Jul. 26, 2016 for PCT application No. PCT/US2015/046837, 7 pages.

(Continued)

*Primary Examiner* — Daeho D Song
(74) *Attorney, Agent, or Firm* — Arent Fox LLP

(57) ABSTRACT

User interface (UI) manipulations may be performed by eliminating noticeable process boundaries associated with or generated by different applications. The techniques herein describe dynamically splitting manipulations across multiple pieces of content without regard to various types and/or states of the user interface manipulations and/or without regard to whether the multiple pieces of content are associated with different individual processes. In at least one example, the techniques described herein enable quick, responsive, and seamless UI manipulations with complex configurations of content on a UI and/or with multiple pieces of content associated with more than one application. Additionally, the techniques described herein further enable content on a UI to "stick" to the user input manipulation or move with the user input manipulation such that the content appears to stay directly in contact with the user input manipulation.

19 Claims, 7 Drawing Sheets

(56) References Cited

U.S. PATENT DOCUMENTS

| | | | |
|---|---|---|---|
| 7,417,644 B2 | 8/2008 | Cooper et al. | |
| 7,548,237 B2 | 6/2009 | David et al. | |
| 7,703,039 B2* | 4/2010 | Agarwal | G06F 3/0481 |
| | | | 715/767 |
| 7,721,308 B2 | 5/2010 | Finger et al. | |
| 8,347,215 B2 | 1/2013 | Carpenter et al. | |
| 8,386,959 B2 | 2/2013 | Rohrabaugh et al. | |
| 8,640,047 B2 | 1/2014 | Mouton et al. | |
| 8,745,527 B2* | 6/2014 | Lee | G06F 3/0483 |
| | | | 709/219 |
| 2003/0095146 A1 | 5/2003 | Roelofs | |
| 2005/0052434 A1* | 3/2005 | Kolmykov-Zotov | |
| | | | G06F 3/038 |
| | | | 345/179 |
| 2006/0103655 A1 | 5/2006 | Nelson et al. | |
| 2007/0035543 A1 | 2/2007 | David et al. | |
| 2007/0075998 A1* | 4/2007 | Cook | G06T 13/00 |
| | | | 345/426 |
| 2007/0157089 A1 | 7/2007 | Van Os et al. | |
| 2007/0226636 A1* | 9/2007 | Carpenter | G06F 3/048 |
| | | | 715/751 |
| 2008/0309630 A1 | 12/2008 | Westerman | |
| 2009/0096758 A1* | 4/2009 | Hotelling | G06F 3/0416 |
| | | | 345/173 |
| 2009/0184939 A1 | 7/2009 | Wohlstadter et al. | |
| 2010/0146458 A1 | 6/2010 | Wadekar | |
| 2010/0162152 A1* | 6/2010 | Allyn | G06F 3/0481 |
| | | | 715/767 |
| 2010/0162180 A1* | 6/2010 | Dunnam | G06F 3/04883 |
| | | | 715/863 |
| 2010/0177049 A1 | 7/2010 | Levy et al. | |
| 2010/0223566 A1 | 9/2010 | Holmes et al. | |
| 2010/0241973 A1 | 9/2010 | Whiddett | |
| 2010/0251112 A1 | 9/2010 | Hinckley et al. | |
| 2010/0281402 A1 | 11/2010 | Staikos et al. | |
| 2011/0018821 A1* | 1/2011 | Kii | G06F 1/1616 |
| | | | 345/173 |
| 2011/0072391 A1 | 3/2011 | Hanggie et al. | |
| 2011/0074710 A1 | 3/2011 | Weeldreyer et al. | |
| 2011/0163874 A1* | 7/2011 | van Os | G01C 21/367 |
| | | | 340/539.13 |
| 2011/0181524 A1* | 7/2011 | Hinckley | G06F 3/04883 |
| | | | 345/173 |
| 2011/0185299 A1 | 7/2011 | Hinckley et al. | |
| 2011/0197160 A1* | 8/2011 | Kim | G06F 17/241 |
| | | | 715/783 |
| 2011/0209100 A1* | 8/2011 | Hinckley | G06F 3/04883 |
| | | | 715/863 |
| 2011/0307833 A1* | 12/2011 | Dale | G06F 3/0488 |
| | | | 715/835 |
| 2012/0054667 A1 | 3/2012 | Beykpour et al. | |
| 2012/0226977 A1 | 9/2012 | Lengeling et al. | |
| 2012/0299845 A1* | 11/2012 | Seo | G06F 1/1641 |
| | | | 345/173 |
| 2012/0311488 A1* | 12/2012 | Mouton | G06F 3/14 |
| | | | 715/800 |
| 2013/0093764 A1 | 4/2013 | Andersson et al. | |
| 2013/0097539 A1* | 4/2013 | M Nsson | G06F 3/0482 |
| | | | 715/765 |
| 2013/0179904 A1* | 7/2013 | Brun | G06F 9/542 |
| | | | 719/318 |
| 2013/0290867 A1* | 10/2013 | Massand | G06F 3/04842 |
| | | | 715/750 |
| 2014/0215336 A1 | 7/2014 | Gardenfors et al. | |
| 2014/0267169 A1* | 9/2014 | Mckiel, Jr. | G06F 3/0421 |
| | | | 345/175 |

OTHER PUBLICATIONS

Cuypers, et al., "Eunomia: Toward a Framework for Multi-touch Information Displays in Public Spaces", In Proceedings of the 22nd British HCI Group Annual Conference on HCI: People and Computers XXII: Culture, Creativity, Interaction—vol. 2, Sep. 1, 2008, 4 pages.

"Intuitive User Experience",Retrieved at «http:f/msdn.microsoft.com/en-us/library/dd371715(VS.85).aspx», Retrieved Date: Jan. 6, 2011, pp. 2.

North, et al.,"Understanding Multi-touch Manipulation for Surface Computing", Retrieved at «http://research.microsoft.com/en-us/um/redmond/groups/cue/publications/interact2009-multitouch.pdf», 2009, pp. 14.

Pawlowski, Marek, "Simultaneous multi-person user interfaces (SMUIs)", Published on Mar. 21, 2012 Available at: http://www.mobileuserexperience.com/?p=2007, 4 pages.

"Touchscreen Interactivity for Large-Format Displays", Published on: Jun. 24, 2012 Available at: http://www.christiedigital.com/en-us/digital-signage/products/christie-i-kit/pages/default.aspx, 7 pages.

"International Search Report and Written Opinion Issued in PCT Patent Application No. PCT/US2015/046837", dated Nov. 3, 2015, 11 Pages.

The PCT International Preliminary Report on Patentability dated Dec. 8, 2016 for PCT application No. PCT/US2015/046837, 14 pages.

* cited by examiner

COMPUTERIZED DYNAMIC SPLITTING OF INTERACTION ACROSS MULTIPLE CONTENT

BACKGROUND

Gestures and other user interface manipulations permit users to manipulate content within user interfaces. Such manipulations include panning through an article, zooming in or out of an image, rotating a piece of content, etc. Current techniques enable processing manipulations of content on a user interface in a dedicated thread that processes the manipulations without regard to processes being executed by an application generating the content. However, such handling has typically been limited to user interface manipulations directed to content generated by a single process or associated with a single application. As a result, current techniques result in poor user experience.

SUMMARY

Techniques for splitting interactions across multiple pieces of content are described. In at least one example, user interface interactions may be performed by eliminating noticeable process boundaries associated with or generated by different applications. In various examples, techniques herein describe dynamically splitting manipulations across multiple pieces of content without regard to various types and/or states of the user interface manipulations and/or without regard to whether the multiple pieces of content are associated with different individual processes.

In at least one example, techniques herein describe collecting information about content available for manipulation on a user interface (UI) to store in an interactive content storage. In response to receiving user input on a user interface, individual pieces of the content on which the user input is received may be identified. In the at least one example, the techniques herein describe identifying the individual pieces of content in the interactive content storage to determine manipulations that are available for the individual pieces of the content. A manipulation of the individual pieces of the content on the UI may be performed based at least in part on the manipulations that are available for the individual pieces of the content.

Additionally, in at least one example, the techniques described herein include receiving user input directed to manipulating two or more pieces of visual content associated with at least one application and determining pieces of visual content that can be manipulated on a user interface based at least in part on the user input and a collection of interactive content. Furthermore, the techniques described herein may include determining which pieces of the visual content are capable of performing manipulations based at least in part on the collection of interactive content and presenting a result of the manipulations of the two or more pieces of visual content on the UI.

The techniques herein also describe systems for implementing the methods described above. In at least one example, a system may include an interactive content module for storing and defining interactive relationships between pieces of content associated with the one or more applications and a gesture targeting module configured for determining particular pieces of content for handling motion caused by user input associated with multiple pieces of content.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

DESCRIPTION OF FIGURES

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
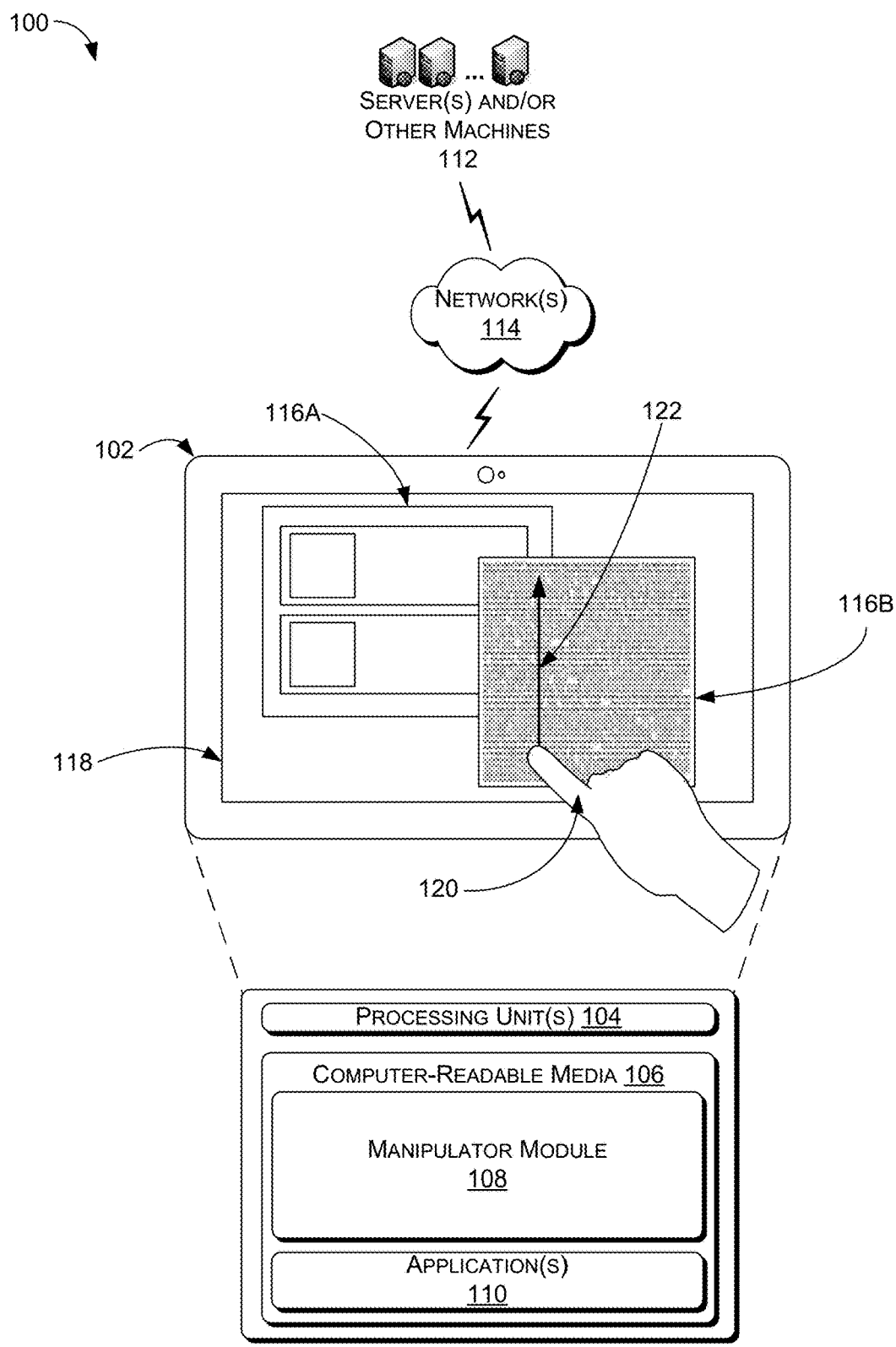
FIG. 1 illustrates an example environment in which techniques for asynchronous handling of dynamic splitting of manipulation across multiple pieces content can be embodied.

Techniques for optimizing user interface (UI) manipulations directed to content presented in the UI are described herein. Gestures and other UI manipulations (e.g., keyboard tabbing, selections using a mouse as user input, etc.) permit users to manipulate content within application interfaces. Such manipulations include panning through an article, zooming in or out of an image, rotating a piece of content, etc. Current techniques enable performing of UI manipulations in a dedicated thread separate from threads performing processes otherwise associated with an application. However, such performing has typically been limited to UI manipulations directed to content in a single process. Current techniques result in poor user experience, particularly when UI manipulations are directed to content presented in complicated configurations or generated by different processes. For example, if a user desires to interact with two or more pieces of content on a user interface that are generated by different applications, the user may be limited in to a single interaction associated with one of the pieces of content. As a result, the user may not be able to move both pieces of content at the same time. The techniques described herein improve UI manipulations by eliminating noticeable process boundaries associated with or generated by different applications.

The techniques herein describe dynamically splitting manipulations across multiple pieces of content without regard to various types of the UI manipulations and/or without regard to whether the multiple pieces of content are associated with different processes. In at least one example, the techniques described herein enable quick, responsive, and seamless UI manipulations with complex configurations of content on a UI and/or with multiple pieces of content associated with more than one application. Additionally, the techniques described herein further enable content on a UI to stick to the user input manipulation or move with the user input manipulation such that the content appears to stay directly in contact with the user input manipulation. In other words, a user may move or arrange content on a display of a device and the techniques described herein enable the content to appear on the display as though it is stuck to the user's finger and/or other user input device.

User manipulations may include numerous user inputs and input devices for interacting with pieces of content on UIs of user devices. For example, a user may use a mouse to click on selectable controls and/or to make a mouse-based gesture. As an additional example, a user may use one or more fingers on one or more hands to gesture through a touch screen display. Alternative or additional input devices such as a stylus or pen may be used to gesture on or through a touch screen display. Voice activation may be an additional or alternative means for providing user manipulation. Another example of a user manipulation may include the movement or motion of objects and/or individuals in three dimensions captured by one or more cameras or other image capture devices. For the purposes of this discussion, gestures are often used as example user inputs directed toward UI manipulations; however, non-gesture user inputs may also or instead be used and are included within the scope of user manipulations.

In some examples, a combination of user inputs and/or input devices may be used for manipulating pieces of content on a UI of a device. For example, a user may interact with a UI by placing two fingers on the UI and using a pen device to draw on the UI while the two fingers are still on the UI. Additional combinations, such as combinations of touch input and voice activation, are also include within the scope of user manipulations. Additionally, user inputs and/or input devices may interact with multiple UIs across multiple user devices.

Content, as described herein, may include interactive content presented on a UI. Interactive content may include pieces of content that may be presented on the UI and may be selected and/or interacted with via user input on the UI. The interactive content may be generated by applications for executing various functionalities. In at least one example, the interactive content may be presented as visual content. For instance, content may include text documents, maps, game pieces, image data, video data, etc. Each piece of content may have boundaries that are useful in determining positions in the content that are responsive to UI manipulation. Boundaries may include a total size of the content, a current resolution of the content, a resolution of the content that is capable of being displayed, a number of pages in an article, a size of each page, a total map size, etc.

As discussed above, current techniques enable performing of UI manipulations in a dedicated thread separate from threads performing processes otherwise associated with the application. The techniques described herein also move content on a thread separate from the thread executing other processes associated with the application. However, unlike the current techniques, the techniques described herein may move content generated by multiple applications on threads separate from the threads executing other processes associated with the multiple applications. Such asynchronous processing optimizes user manipulations associated with UI manipulations by providing quick, responsive, and seamless UI manipulations across pieces of visual content that may be generated by different applications.

Illustrative Environment

The environments described below constitute but one example and are not intended to limit application of the system described below to any one particular operating environment. Other environments may be used without departing from the spirit and scope of the claimed subject matter. The various types of processing described herein may be implemented in any number of environments including, but not limited to, stand alone computing systems, network environments (e.g., local area networks or wide area networks), peer-to-peer network environments, distributed-computing (e.g., cloud-computing) environments, etc.

FIG. 1 illustrates an example environment 100 in which techniques for asynchronous handling of dynamic splitting of manipulation across multiple pieces of content can be embodied. In at least some examples, handling may refer to performing a manipulation, executing a manipulation, receiving a manipulation, and/or processing a manipulation. Environment 100 includes a computing device 102. In at least one example, computing device 102 may include processing unit(s) 104 and computer-readable media 106. Computer-readable media 106 may include components that facilitate interactions with the user device 102. For example, the computer-readable media 106 may include at least a manipulator module 108 that can be implemented as computer-readable instructions, various data structures, and so forth via at least one processing unit(s) 104 to configure a device to execute instructions and to perform operations for handling dynamic splitting of manipulation across multiple pieces of content. Functionality to perform these operations may be included in multiple devices or a single device. The computer-readable media 106 may additionally include application(s) 110 associated with various operations. The application(s) 110 may render content associated with the various operations on the UIs associated with the computing device 102.

The computing device 102 presents one or more application interfaces 116A and 116B on a touch screen UI 118. The touch screen UI 118 may be configured for receiving user manipulations via user input such as one or more fingers of the user 120 and/or a pen or other stylus configured for providing touch input. In the case of a stylus, the stylus may be active and/or passive. As described above, user manipulations may include various other types of user inputs and input devices. The user input may be directed towards UI manipulation of applications 110 (e.g., applications associated with application interface 116A and 116B) on the touch screen UI 118. In at least one example, as shown in example environment 100, the user input is shown by arrow 122 and is directed toward manipulating application interfaces 116A and 116B. The user input 120/122 is shown as a flick-up, single-finger gesture directed to manipulating the UI interface by quickly panning through the content displayed in application interface 116A and/or application interface 116B.

In at least one example, environment 100 may include server(s) and/or other machines 112 and wired and/or wireless communication network(s) 114, which enable communication between computing device 102 and the one or more server(s) and/or other machine(s) 112. In some examples, the server(s) and/or other machines 112 may include one or more computing devices that operate in a cluster or other grouped configuration to share resources, balance load, increase performance, provide fail-over support or redundancy, or for other purposes which enable communication between the computing device 102 and the one or more server(s) and/or other machines 112. The communication network(s) 114 may be any type of network known in the art, such as the Internet and as described below.

Figure 2:
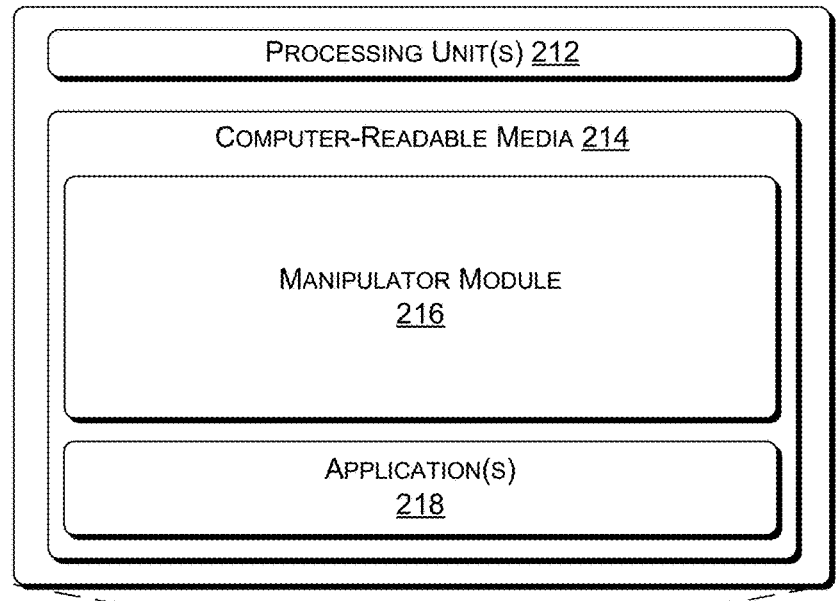
FIG. 2 illustrates an example operating environment that includes a variety of devices and components that may be implemented in a variety of environments for the asynchronous handling of dynamic splitting of manipulation across multiple pieces of content.
Figure 2:
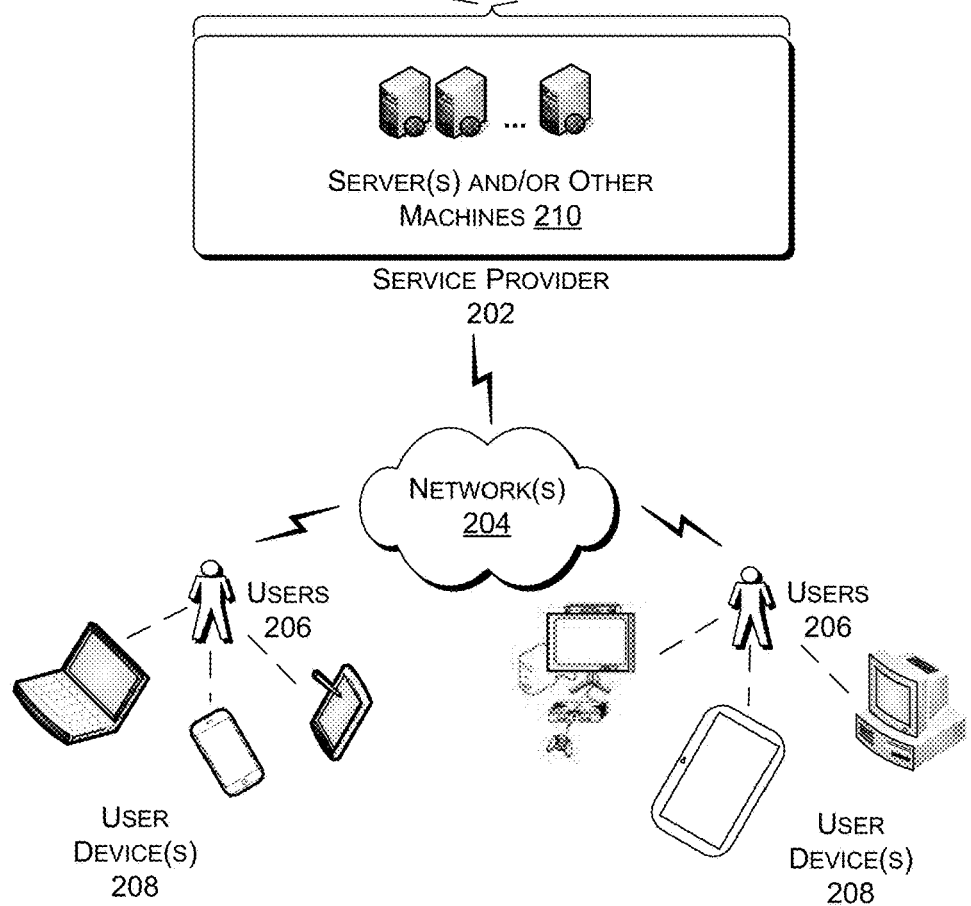

FIG. 2 illustrates an example operating environment 200 that includes a variety of devices and components that may be implemented in a variety of environments for the asynchronous handling of dynamic splitting of manipulation across multiple pieces of content. In at least one example, the techniques described herein may be performed remotely (e.g., by a server, cloud, etc.). In some examples, the techniques described herein may be performed locally on a user device, such as computing device 102.

The example operating environment 200 may include a service provider 202, one or more network(s) 204, one or more users 206, and one or more user devices 208 associated with the one or more users 206. As shown, the service provider 202 may include one or more server(s) and/or other machines 210, any of which may include one or more processing unit(s) 212 and computer-readable media 214. The server(s) and/or other machines 210 may be the same one or more server(s) and/or other machines 112 as shown in FIG. 1. In various webservice or cloud based embodiments, the service provider 202 may asynchronously perform dynamic splitting of manipulation across multiple pieces of content displayed on a user device, such as any of user devices 208 or computing device 102.

In some embodiments, the network(s) 204 may be any type of network known in the art, such as the Internet. The network(s) 204 may be the same as network(s) 114 as shown in FIG. 1. Moreover, the user devices 208 may communicatively couple to the network(s) 204 in any manner, such as by a global or local wired or wireless connection (e.g., local area network (LAN), intranet, etc.). The network(s) 204 may facilitate communication between the server(s) and/or other machines 210 and the user devices 208 associated with the users 206.

In some embodiments, the users 206 may operate corresponding user devices 208 to perform various functions associated with the user devices 208, which may include one or more processing unit(s), computer-readable storage media, and a display. Furthermore, the users 206 may utilize the user devices 208 to communicate with other users 206 via the one or more network(s) 204.

User device(s) 208 can represent a diverse variety of device types and are not limited to any particular type of device. Examples of user device(s) 208 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like. Computing device 102 may be any of the user device(s) 208 described above.

The service provider 202 may be any entity, server(s), platform, etc., that may leverage a collection of features from communication platforms, including online communication platforms, to measure the interaction dynamics between users of the communication platforms. Moreover, and as shown, the service provider 202 may include one or more server(s) and/or other machines 210, which may include one or more processing unit(s) 212 and computer-readable media 214 such as memory. The one or more server(s) and/or other machines 210 may include devices.

Examples support scenarios where device(s) that may be included in the one or more server(s) and/or other machines 210 can include one or more computing devices that operate in a cluster or other grouped configuration to share resources, balance load, increase performance, provide failover support or redundancy, or for other purposes. Device(s) included in the one or more server(s) and/or other machines 210 can belong to a variety of categories or classes of devices such as traditional server-type devices, desktop computer-type devices, mobile devices, special purpose-type devices, embedded-type devices, and/or wearable-type devices. Thus, although illustrated as server computers, device(s) can include a diverse variety of device types and are not limited to a particular type of device. Device(s) included in the one or more server(s) and/or other machines 210 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that may be included in the one or more server(s) and/or other machines 210 can include any type of computing device having one or more processing unit(s) 212 operably connected to computer-readable media 214 such as via a bus, which in some instances can include one or more of a system bus, a data bus, an address bus, a PCI bus, a Mini-PCI bus, and any variety of local, peripheral, and/or independent buses. Executable instructions stored on computer-readable media 214 can include, for example, manipulator module 216, and other modules, programs, or applications that are loadable and executable by processing units(s) 212. Alternatively, or in addition, the functionality described herein can be performed, at least in part, by one or more hardware logic components or accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) that may be included in the one or more server(s) and/or other machines 210 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Devices that may be included in the one or more server(s) and/or other machines 210 can also include one or more network interfaces coupled to the bus to enable communications between computing devices and other networked devices such as user device(s) 208. Such network interface(s) can include one or more network interface controllers (NICs) or other types of transceiver devices to send and receive communications over a network. For simplicity, some components are omitted from the illustrated device.

Processing unit(s) 212 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various embodiments, the processing unit(s) 212 may execute one or more modules and/or processes to cause the server(s) and/or other machines 210 to perform a variety of functions, as set forth above and explained in further detail in the following disclosure. Additionally, each of the processing unit(s) 212 may possess its own local memory, which also may store program modules, program data, and/or one or more operating systems.

In at least one configuration, the computer-readable media 214 of the server(s) and/or other machines 210 may include components that facilitate interaction between the service provider 202 and the users 206. For example, the computer-readable media 214 may include at least a manipulator module 304 that can be implemented as computer-readable instructions, various data structures, and so forth via at least one processing unit(s) 212 to configure a device to execute instructions and to perform operations for handling dynamic splitting of manipulation across multiple pieces of content. Functionality to perform these operations may be included in multiple devices or a single device.

The computer-readable media 214 may additionally include application(s) 218 associated with various operations. The application(s) 218 may render content associated with the various operations on the UIs associated with the user device(s) 208. The content may include visuals and in at least some examples, users 206 may interact with the content via UI manipulations on the user devices 208.

Depending on the exact configuration and type of the one or more server(s) and/or other machines 210, the computer-readable media (e.g., computer-readable media 106 and computer-readable media 214) may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media includes computer readable instructions, data structures, program modules, or other data in a modulated data signal, such as a carrier wave, or other transmission mechanism. As defined herein, computer storage media does not include communication media.

Figure 3:
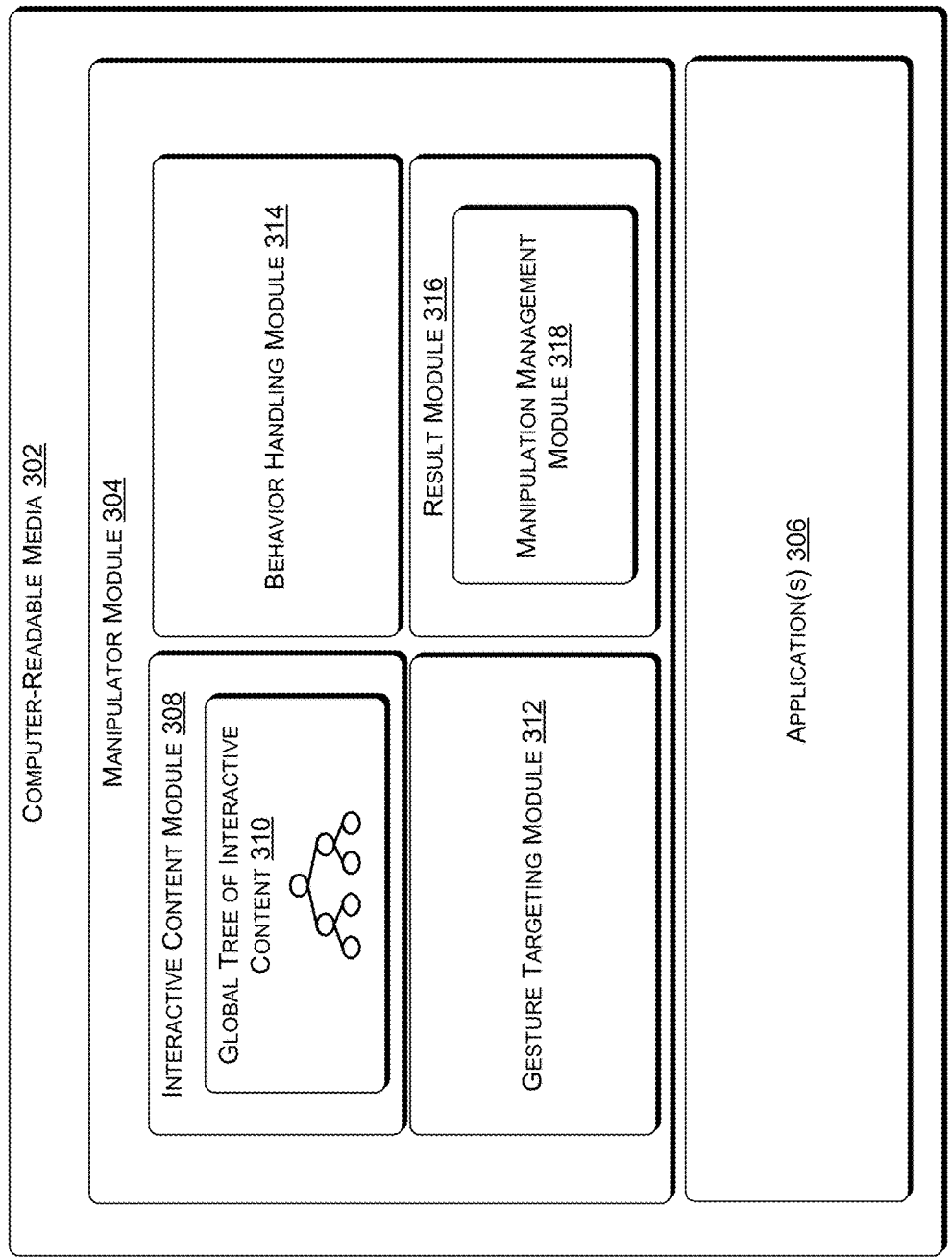
FIG. 3 illustrates an example operating environment for the asynchronous handling of dynamic splitting of manipulation across multiple pieces of content

FIG. 3 illustrates an example operating environment 300 for the asynchronous handling of dynamic splitting of manipulation across multiple pieces of content. Example operating environment 300 shows the computer-readable media 300, which may represent computer-readable media 106 of FIG. 1 and/or computer-readable media 214 of FIG. 2 in more detail. In at least one example, computer-readable media 300 may include the manipulator module 304 (e.g., manipulator module 108 and/or manipulator module 216) and one or more applications 306 (e.g., one or more application(s) 110 and/or one or more application(s) 218), as described above. In the at least one example, the manipulator module 304 includes various modules and components for asynchronously handling UI manipulation across multiple pieces of content. In at least one example, the manipulator module 304 includes an interactive content module 308 that may store a global tree of interactive content 310, a gesture targeting module 312, a behavior handling module 314, and a result module 316.

The interactive content module 308 may store information about the UI and its elements. For example, the interactive content module 308 may store information about content that is available for user manipulation and interactive properties associated with specific pieces of content as presented on the UI. In some examples, the interactive content module 308 may store information about content that is available for user manipulation and interactive properties associated with specific pieces of content as presented on multiple UIs. In at least one example, the interactive content module 308 may store the interactive content in a tree made up of nodes. A root node of the tree may represent a UI window and sub-nodes of the tree may represent application windows within the UI window. In at least one example, the sub-nodes representing applications (e.g., application(s) 218) may be considered parent nodes. Each of the parent nodes may contain sub-nodes that represent pieces of visual content associated with the applications (e.g., application(s) 218). In the at least one example, the sub-nodes associated with the parent nodes may be considered child nodes.

The interactive content module 308 also may store visuals that are present within the system (e.g., 200, 300). In at least one example, the visuals may be stored in a tree of visuals. In some examples, the interactive content that is maintained in the interactive content tree and the tree of visuals may be integrated as a global tree of interactive content 310. As a result of the integration, the global tree of interactive content 310 may tie each of the manipulations to one or more of the visuals allowing the interactive content module 308 to understand the relationships between each of the visuals to other visuals and/or parent and child relationships. The global tree of interactive content 310 may be used to determine how each piece of content may interact with one another. The global tree of interactive content 310 may be stored in the interactive content module 308. The global tree of interactive content 310 may be leveraged to determine which pieces of content are included in a given manipulation, reduce the response time between receiving user input and effectuating a manipulation, and/or accommodate motion across process boundaries.

In at least one example, the global tree of interactive content 310 may allow pieces of content associated with a given manipulation to be determined based on the collective configurations of the content. In at least some examples, the global tree of interactive content 310 includes each of the applications running in all of the processes on the user device 208. The global tree of interactive content 310 ties interactive properties to the individual pieces of content as seen on a UI without regard to which process is generating each piece of content. Accordingly, UI manipulation may be transferred between pieces of content that are generated by different processes. This enables smooth, uninterrupted UI manipulations of content on a UI such that users 206 interacting with the UI are not aware that various pieces of content are generated by different processes.

The interactive content module 308 may use a visual tree for performing an initial hit-test after receiving user input directed toward UI manipulation. Based on the initial hit-test, the manipulator module may determine whether geometries or point values fall within rendered content of a piece of content to effectuate the desired UI manipulation. The hit-testing may be performed against non-UI elements (such as visuals or graphics objects) and/or multiple objects (such as overlapping objects). The interactive content module 308 may determine a chain of interactive content based on the results of the hit-test. In at least one example, if there are multiple user inputs, the individual chains of interactive content may be joined to establish a tree representative of the interactive content involved in the multiple user input manipulation. The interactive content module 308 may compare the resulting tree of interactive content with the global tree of interactive content 310 to identify individual pieces of content that could potentially be manipulated based on the user inputs. When the user 206 interacts with pieces of content, the maintained global tree of interactive content 310 may identify how individual pieces of content may be manipulated or may move. Maintaining how the pieces of content may interact reduces the decision making delay previously experienced in previous systems.

In at least one example, a user 206 may provide additional inputs directed toward a new and/or different UI manipulation. In some examples, the user 206 may provide the additional inputs during an ongoing UI manipulation. By maintaining the global tree of interactive content 310, the interactive content module 308 may effectuate a UI manipulation as soon as the user 206 provides the additional input. In the at least one example, the interactive content module 308 may use the visual tree to perform an additional hit-test to identify which geometries or point values fall within rendered content of a visual to effectuate the desired UI manipulation. After performing the hit-test, the interactive content module 308 may effectuate the UI manipulation desired by the user input.

The gesture targeting module 312 stores gesture targeting logic for determining which piece of content may receive and/or perform a particular motion created by a UI manipulation that affects multiple pieces of content. To determine which piece of content receives and/or performs the motion, the gesture targeting module 312 considers motion supported by particular pieces of content, transforms of the content, and/or motion of other pieces of content. Additionally, the gesture targeting logic includes an algorithm and policy rules for how pieces of content perform chaining reactions, or interactions between parent pieces of content and child pieces of content when a child piece of content reaches a boundary and as a result, the parent piece of content may be manipulated.

In at least one example, the gesture targeting module 312 traverses the global tree of interactive content 310 stored in the interactive content module 308. The gesture targeting module 312 traverses the global tree of interactive content 310 starting at parent nodes associated with a particular piece of content and continuing to child nodes associated with the particular piece of content to determine the types of manipulation that are possible for the particular piece of content. Additionally, the gesture targeting module 312 may identify restrictions that the parent nodes have placed on the associated child nodes or the child nodes have placed on the associated parent node.

Then, the gesture targeting module 312 traverses the global tree of interactive content 310 in the opposite direction, starting at the child nodes and continuing to the parent nodes. Each child node identifies manipulations that either the child node or its parent node may perform and, depending on whether the child node supports the manipulations, the child node may project the manipulations to a coordinate space supported by the piece of content. If the manipulation is prohibited from child nodes, the gesture targeting module 312 may continue to project the manipulation to the coordinate space supported by the piece of content. However, if the manipulation is permitted by the child nodes, the gesture targeting module 312 may filter such manipulation from the process projected to the coordinate space. Any unsupported (or unperformed) manipulations may be projected into the coordinate space of the supported manipulations. If the resulting UI manipulation involves a manipulation that is supported by this content and the manipulation is not prohibited based on parent node and child node limitations, then the content performs the motion and marks the manipulation as performed before continuing to traverse the rest of the tree. The reverse traversal described above enables child nodes to process manipulations before parent nodes and also allows different nodes to perform different manipulations.

In at least one example, the gesture targeting module 312 may determine how user input may be allocated when the user 206 interacts with a parent piece of content and child pieces of content via multiple user inputs and/or user devices. The gesture targeting module 312 may determine how the parent piece of content and child pieces of content share the individual user inputs. In at least one example, the parent piece of content may perform all of the manipulations. In other examples, the parent piece of content may permit the child pieces of content to perform the manipulations. In some examples, the parent piece of content may permit the child pieces of content to filter the manipulations to other pieces of content to perform the manipulations. The gesture targeting module 312 may determine how user input may be allocated when the user 206 interacts with a parent piece of content and child pieces of content via multiple user inputs and/or user devices based on the gesture targeting module 312 traversing the global tree of interactive content 310.

In at least one example, the user 206 may input a diagonal gesture directed to two pieces of content. In at least one example, one child node associated with one of the pieces of content may be limited to vertical movement and another child node associated with the other piece of content may be limited to horizontal movement. As a result of the reverse traversal of the global tree of interactive content 310, the child node associated with the piece of content that is limited to the vertical movement may perform the vertical motion and may project the horizontal motion to the coordinate space supported by the piece of content. The other child node associated with the other piece of content that is limited to horizontal movement may perform the horizontal movement. As a result both pieces of content may move in their respective directions so that the content appears to stick to the user input.

The gesture targeting module 312 may move multiple pieces of content together despite multiple user inputs being present on the content or different rotations of the content. In at least one example, if a user 206 is interacting with a user device 208 via touch input and a single finger is on a child piece of content and a single finger is on the parent piece of content, the gesture targeting module 312 may move both the child and the parent to keep the content under the user's 206 fingers. If one of the pieces of child content inside a piece of parent content is rotated, the gesture targeting module 312 may generate additional motion on the parent piece of content to keep the child piece of content directly under the user's 206 finger.

The behavior handling module 314 may leverage multiple criteria to configure the operations to be performed on the content. In at least one example, the behavior handling module 314 may consider a type of gesture, a current state of user input (e.g., active or passive), and/or motion which is being performed by other pieces of content. A type of gesture may include gestures such as tapping, holding, panning, and/or zooming. Directions of panning and zooming gestures may be configured separately. For example, a piece of content may be configured to accept panning to the right, but may be prohibited from panning to the left. The behavior handling module 314 may also consider the current state of user input, or the state of user input across any type of input modality such as touch, pen, mouse, movement, etc. In at least one example, if a user 206 interacts with a user device 208 via touch input, the behavior handling module 314 may provide different gesture configurations based on the number of fingers that are in contact with the screen. In another example, if a user 206 interacts with a user device 208 via pen input, the behavior handling module 314 may route the input to different pieces of content based on the state of the barrel buttons, or the orientation of the pen.

The behavior handling module 314 may also consider motion that is performed by other pieces of content. For instance, a parent piece of content may prohibit a child piece of content from performing manipulations based on the manipulations that the parent piece of content is performing. For example, if a user 206 is reading a long document on a user device 208, the content associated with the long document may prohibit other pieces of content from panning in any direction other than vertical. Additionally, a parent piece of content may prohibit itself from performing manipulations based on the manipulations being performed by child pieces of content. In at least one example, if a user 206 is interacting with an application that provides the user 206 with a plurality of puzzle pieces and the user 206 places his or her fingers on the UI to move two or more puzzle pieces, the parent piece of content may be prohibited from zoom manipulations that would otherwise result from the user 206 providing multiple user inputs associated with the parent piece of content. In another example, an application (e.g., a disc jockey application for mixing music) may provide multiple slider controls to the user 206. To interact with the slider controls, the user 206 may pan multiple sliders at the same time. Generally, multiple user inputs would result in a zooming function. However, the parent piece of content may prohibit the zoom manipulations and instead permit the pieces of child content to pan simultaneously without effectuating the zooming function.

The behavior handling module 314 also allows dynamic changes to configurations of interactable content during a UI manipulation. In at least one embodiment, the behavior handling module 314 declares a configuration for the content before receiving user input and the configuration may be based at least in part on the global tree of interactive content 310. Dynamic changes enable the behavior handling module 314 to modify a direction of motion, or manipulation, during the UI manipulation. For instance, if a piece of content moves until it reaches a boundary, the behavior handling module 314 may decide how to reconfigure the content based on the global tree of interactive content 310.

In at least one example, the content may accumulate any motion it has performed during a single manipulation. The resulting motion may affect chaining interactions associated with parent pieces of content and child pieces of content. As described above, chaining describes interactions between parent pieces of content and child pieces of content when a child piece of content reaches a boundary and as a result, the parent piece of content may move. In at least one example, a user 206 may interact with a child piece of content by panning the child piece of content in a particular direction. When the child piece of content reaches a boundary, the child piece of content may be restricted from moving any further on the UI and the parent piece of content may continue to move. Any panning in a direction opposite the direction the parent piece of content is moving may be restricted until the parent piece of content returns to its original position. That is, the child piece of content may not move in an opposite direction until it accumulates motion back in the opposite direction.

Once the gesture targeting module 312 and the behavior handling module 314 have determined pieces of content for performing the user manipulation and how the pieces of content will be manipulated, the result module 316 may deliver results to the target destination to manipulate individual pieces of content on the UI. The target destination may be the application or the piece of content. In at least one example, the gesture targeting module 312 and the behavior handling module 314 may process a particular user input and the result module 316 may return a target destination or may defer a target decision until a predetermined period of time passes. In at least one example, the result module 316 may include a manipulation management module 318 and lower level input stacks for interpreting the decision and routing the input to the target destination. The target destination may be any generic input recipient (e.g., a Win32 HWND or an ALPC endpoint). If the gesture targeting module 312 and the behavior handling module 314 do not identify a target for a particular user input, result module 316 may buffer the input until a target is decided at a later time, either by new input or an elapsed period of time. When the gesture targeting module 312 and the behavior handling module 314 determine a target piece of content, any previously buffered input for the user input may be reassigned, in chronological order, to the target destination.

In at least one example, a user 206 may provide more than one input. For instance, a user 206 may use two fingers on a touch screen at or near a same time. In the at least one example, the result module 316 may delay returning a target for a first input until a target for a subsequent input has been decided. In at least one example, the manipulation management module 318 may buffer the input until the target for the subsequent input has been decided. The decision may be based on receiving a new user input or an elapsed period of time. The buffering may allow the result module 316 to determine whether a first input and a second input should be sent to the same target piece of content and whether the first input or the second input is associated with a piece of content that is a child content of the other content.

In some examples, a user 206 may direct its input to a particular piece of content and then redirect the input to a different piece of content in the same user input. In such examples, the result module 316 may notify each piece of content of changes in the input delivery so that the initial piece of content knows not to expect any additional input and the subsequent piece of content knows that it will begin receiving input. To accomplish such notification, the result module 316 may send notifications to each of the pieces of content. A lost capture notification may notify the piece of content that was the original target of user input that it will no longer be receiving additional input. That is, in response to user input leaving or being transferred from a piece of content, the result module 316 may notify the piece of content that it will no longer receive input. An acquired capture notification may notify the piece of content that is the new target and that it will now be receiving input. That is, in response to user input starting on a new piece of content and/or being transferred to a piece of content, the result module 316 may notify the piece of content that it will be receiving user input going forward. An end capture notification may notify all pieces of content that the user manipulation has disengaged with the user device 208.

The notifications described above may be useful for chaining from a child piece of content with end-of-manipulation effects (e.g., snap points) to a parent piece of content. For instance, a user 206 may pan such to cause a child piece of content to reach its boundary. Upon reaching the boundary the result module 316 may provide a capture lost notification to notify the child piece of content that it will no longer be receiving input and that some other piece of content will be receiving input for the same user manipulation. As a result, the child piece of content may defer any end-of-manipulation effects. Additionally, as a result of the child piece of content reaching its boundary and receiving the lost capture notification, the parent piece of content may receive an acquired capture notification, indicating that it is the target of the user input. The acquired capture notification may allow the parent piece of content to distinguish the transition of user input from the child piece of content to the parent piece of content from a new user manipulation. When the user 206 disengages with the user device 208, the end capture notification may be provided to all pieces of content so that each may effectuate their own end-of-manipulation effects (e.g., snap points).

As described above, the result module 316 may leverage the gesture targeting logic for calculating a transform of any motion that may be applied to each piece of content. The gesture targeting logic may be used to apply the transforms directly to the pieces of content without requiring any work from the application. In addition to directly applying the transforms, each transform may be exposed to the application as a structure of manipulations for each piece of content. For example, the panning and zooming motions that the gesture targeting logic may determine may be performed by each piece of content for a given input frame. In at least some embodiments, multiple pieces of content may perform motion simultaneously or substantially simultaneously.

Figure 4:
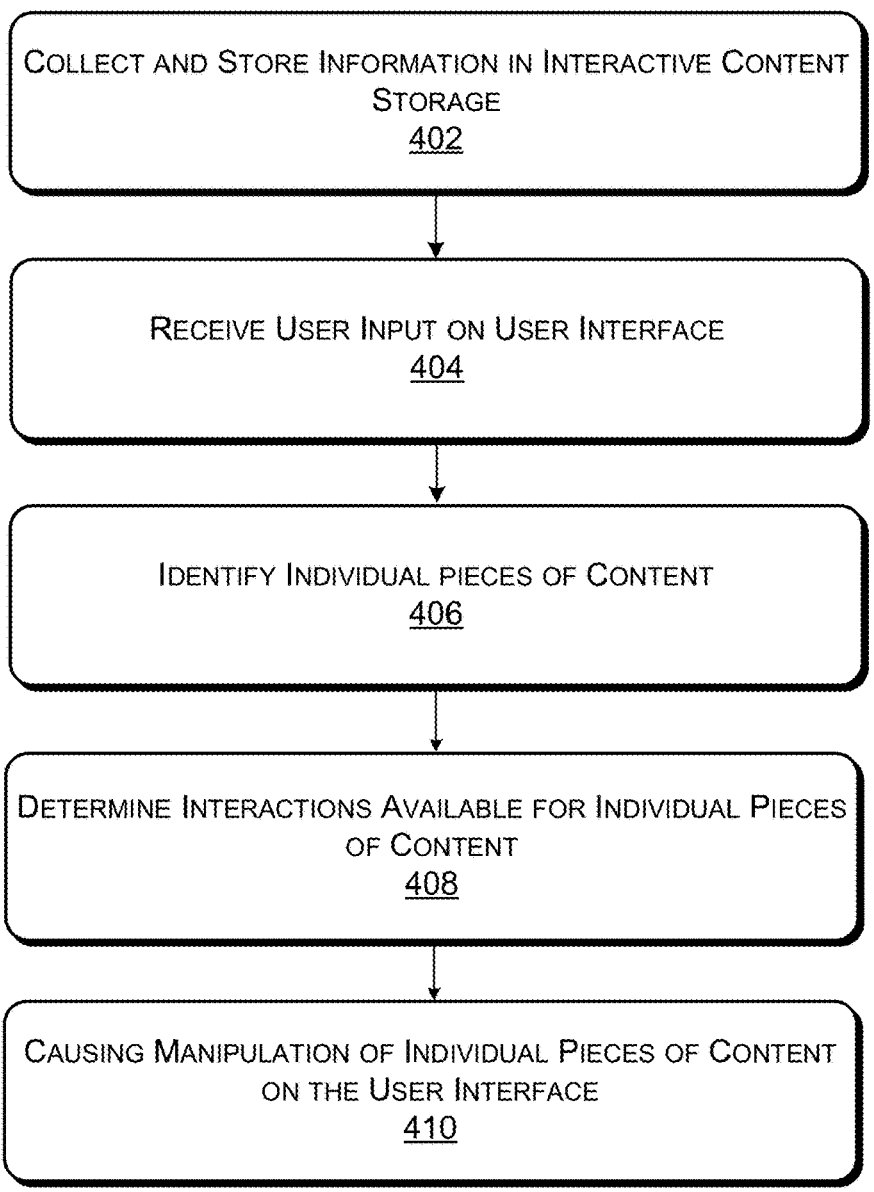
FIG. 4 illustrates a process for manipulating pieces of content on a user interface (UI).

FIG. 4 illustrates a process 400 for manipulating pieces of content on a UI, such as UI 118.

Block 402 illustrates the interactive content module 308 collecting and storing information in an interactive content storage. As described above, the interactive content module 308 may store information about the UI and its elements. For example, the interactive content module 308 may store information about content that is available for user manipulation and interactive properties associated with specific pieces of content as presented on the UI. The interactive content module 308 also may store visuals that are present within the system (e.g., 200, 300). In at least one example, the visuals may be stored in a tree of visuals. In some examples, the interactive content that is maintained in the interactive content tree and the tree of visuals may be integrated in a global tree of interactive content 310.

Block 404 illustrates receiving user input on a UI. As described above, a user 206 may interact with the UI via numerous types of user inputs and input devices. Additionally, users 206 may interact with multiple UIs.

Block 406 illustrates the interactive content module 308 identifying individual pieces of content. As described above, the interactive content module 308 may use a visual tree for performing an initial hit-test after receiving user input directed toward UI manipulation. Based on the initial hit-test, the manipulator module 304 may determine whether geometries or point values fall within rendered content of a piece of content to effectuate the desired UI manipulation. In some examples, the interactive content module 308 may determine a chain of interactive content based on the results of the hit-test.

Block 408 illustrates the interactive content module 308 determining manipulations that are available to the individual pieces of the content. The interactive content module 308 may compare the results of the hit-test with the global tree of interactive content 310 to identify individual pieces of content that could potentially be manipulated based on the current user inputs, as described above. When the user 206 interacts with pieces of content, the maintained global tree of interactive content 310 may identify how individual pieces of content may move or otherwise be manipulated.

Block 410 illustrates the result module 316 causing manipulation of individual pieces of content on the UI. In at least one example, the result module 316 may directly modify the presentation of the individual pieces of content on the UI. In other examples, the result module 316 may send input to the one or more application(s) 306 to manipulate the individual pieces of content, instead of directly manipulating the individual pieces of content on the UI.

Figure 5:
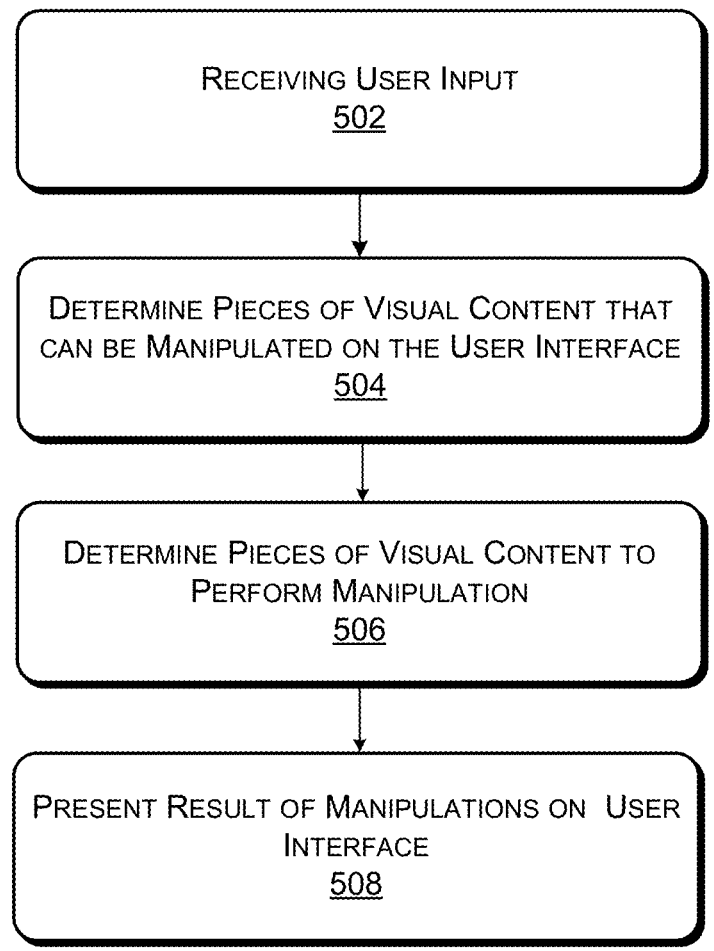
FIG. 5 illustrates a process for presenting results of manipulations on a UI.

FIG. 5 illustrates a process 500 for presenting pieces of visual content on a UI, such as UI 118.

Block 502 illustrates receiving user input on a UI. As described above, a user 206 may interact with one or more UIs via numerous user inputs and input devices.

Block 504 illustrates the gesture targeting module 312 determining pieces of visual content that can be manipulated on the UI. To determine which piece of content performs the manipulation, the gesture targeting module 312 employs gesture targeting logic that considers manipulations supported by particular pieces of content, transforms of the content, and/or manipulations of other pieces of content, as described above.

Block 506 illustrates the behavior handling module 314 determining pieces of visual content to perform manipulating the pieces of visual content on the UI. The behavior handling module 314 may leverage multiple criteria to configure the operations to be performed on the content. As described above, the behavior handling module 314 may consider a type of gesture, a current state of user input, and/or motion which is being performed by other pieces of content.

Block 508 illustrates the result module 316 presenting the result of the manipulations of the two or more pieces of visual content on the UI.

Figure 6:
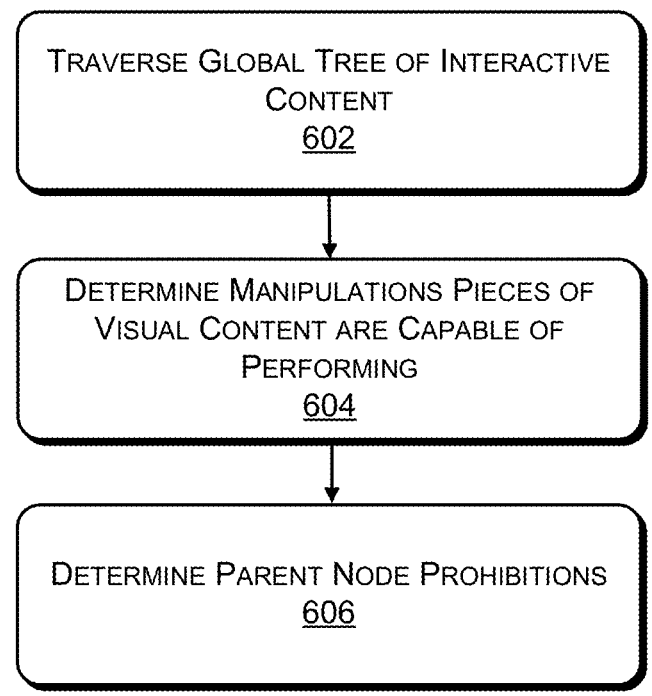
FIG. 6 illustrates a process for traversing a global tree of interactive content.

FIG. 6 illustrates a process 600 for forward traversal of the global tree of interactive content 310. Block 602 illustrates the gesture targeting module 312 traversing global tree of interactive content 310. The gesture targeting module 312 traverses the global tree of interactive content 310 starting at parent nodes associated with a particular piece of content and continuing to child nodes associated with the particular piece of content to determine the types of manipulation that are possible for the particular piece of content. Block 604 illustrates the gesture targeting module 312 determining manipulations that pieces of visual content are capable of performing based at least in part on the interactions stored in the global tree of interactive content 310. Block 606 illustrates the gesture targeting module 312 determining parent node prohibitions. As described above, in at least one example the parent node may impose limitations on what manipulations the children nodes may perform. As a result, the gesture targeting module 312 determines manipulations that the one or more child nodes are not permitted to perform based on the parent node restrictions.

Figure 7:
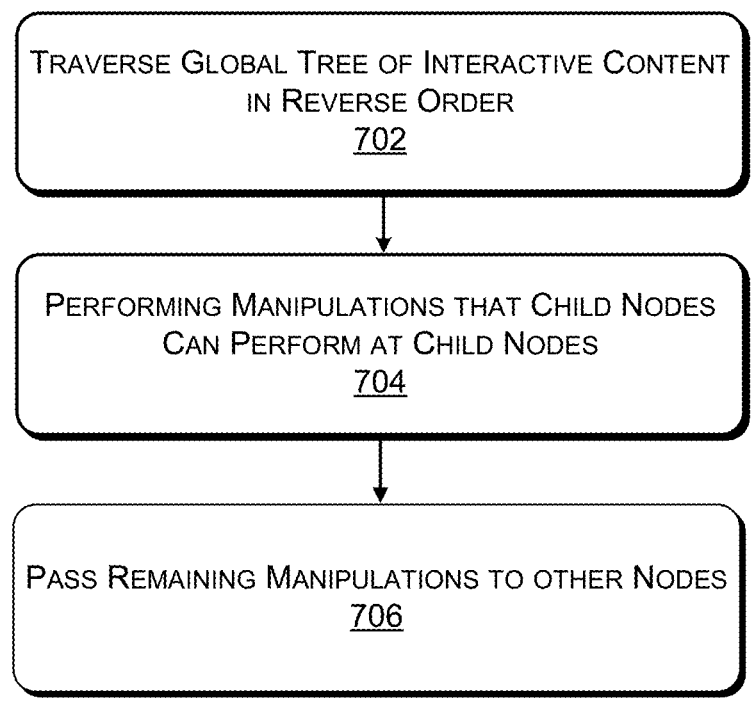
FIG. 7 illustrates a process for traversing a global tree of interactive content.

FIG. 7 illustrates a process 700 for reverse traversal of the global tree of interactive content 310. Block 702 illustrates the gesture targeting module 312 traversing the global tree of interactive content 310 in the reverse direction, starting at the child nodes and continuing to the parent nodes.

Block 704 illustrates the gesture targeting module 312 performing the manipulations that each of the child nodes can perform at the child nodes. As described above, each child node identifies manipulations that either the child node or its parent node may perform and the child node projects the manipulation to a coordinate space supported by the piece of content. If the manipulation is prohibited from child nodes, the gesture targeting module 312 may continue to project the manipulation to the coordinate space supported by the piece of content. If the manipulation is permitted by the child nodes, the gesture targeting module 312 may filter such manipulation from the process projected to the coordinate space.

Block 706 illustrates passing any remaining manipulations to other nodes of the global tree of interactive content 310 for processing. Any unsupported (or unperformed) manipulations may be projected into the coordinate space of the supported manipulations.

CONCLUSION

In closing, although the various embodiments have been described in language specific to structural features and/or methodical acts, it is to be understood that the subject matter defined in the appended representations is not necessarily limited to the specific features or acts described. Rather, the specific features and acts are disclosed as example forms of implementing the claimed subject matter.

Example Clauses

A. A computer-implemented method comprising: collecting information about content available for manipulation on a user interface (UI) in an interactive content storage; receiving user input via the UI; in response to receiving the user input, identifying at least one piece of the content with which the user input pertains; identifying the at least one piece of content in the interactive content storage to determine manipulations that are available for at least one piece of the content; and in response to determining the manipulations that are available for at least one piece of the content, causing manipulation of the at least one piece of the content on the UI based at least in part on the manipulations that are available for the at least one piece of the content.

B. A computer-implemented method as paragraph A recites, wherein the identifying the at least one piece of the content comprises identifying two or more pieces of content, and at least some of the two or more pieces of the content are generated by different applications.

C. A computer-implemented method as either paragraph A or B recites, wherein the interactive content storage comprises a tree of interactive content including: information about interactions available for the individual pieces of the content; and information about content available for manipulation to identify interactive relationships between the content available for manipulation.

D. A computer-implemented method as paragraph C recites, the user input comprises touch input and the touch input includes two or more points of contact; and the method further comprises determining a chain of interactive content based on the at least one piece of the content and the two or more points of contact.

E. A computer-implemented method as paragraph D recites, further comprising identifying the chain of interactive content in the tree of interactive content to determine manipulations that are available for the at least one piece of the content.

F. A computer-implemented method as paragraph C recites, further comprising receiving a new user input via the UI; and causing manipulation of the individual pieces of content on the UI based at least in part on the tree of interactive content.

G. A system comprising computer-readable media storing at least a manipulator module and one or more applications; a processing unit operably coupled to the computer-readable media, the processing unit adapted to execute at least the manipulator module and the one or more applications, the manipulator module comprising: an interactive content module configured to store and define interactive relationships between pieces of content associated with the one or more applications; and a gesture targeting module configured to determine particular pieces of content for performing manipulations caused by user input associated with multiple pieces of content.

H. A system as paragraph G recites, a behavior handling module configured to determine operations to be performed on the multiple pieces of content based on at least one of a type of gesture, a current state of user input, or manipulation that is being performed by individual pieces of the multiple pieces of content.

I. A system as either paragraph G or H recites, further comprising, a result module configured to deliver results to the one or more applications or to directly deliver the manipulation performed by the particular pieces of content.

J. A system as any one of paragraphs G-I recites, the interactive relationships between the pieces of the content are stored and defined in a tree of interactive content; and the gesture targeting module is further configured to traverse the tree of interactive content starting at parent nodes associated with the one or more applications and continuing to child nodes associated with the pieces of content to determine types of manipulations permissible for the pieces of content.

K. A system as paragraph J recites, wherein the parent nodes restrict manipulations of the child nodes or child nodes restrict manipulations of the parent nodes.

L. A system as paragraph J recites, wherein in response to traversing the tree of interactive content starting at the parent nodes and continuing to the child nodes, the gesture targeting module is further configured to traverse the tree of interactive content starting at the child nodes and continuing to the parent nodes to identify manipulations that individual child nodes can perform.

M. A system as any of paragraphs G-I, K, or L recites, wherein the result module is further configured to deliver the results responsive to receiving the user input or at a later time.

N. A system as paragraph M recites, wherein the delivering the results at the later time comprises delivering the results upon receiving a new user input or after a lapse in a predetermined period of time.

O. A system as any one of paragraphs G-I, K, L, or N recites, wherein the result module is further configured to provide notifications to the individual pieces of the multiple pieces of content, the providing notifications comprising: in response to the user input leaving an individual piece of content, providing a lost capture notification to the individual pieces; in response to the user input transferring to a new piece of content, providing an acquired capture notification; and in response to terminating the user input, providing a capture end notification.

P. A system as any one of paragraphs G-I, K, L, N, or O recites, wherein the result module is further configured to perform transforms on the multiple pieces of content without requiring any processing from the one or more applications.

Q. One or more computer-readable media encoded with instructions that, when executed by a processor, configure a computer to perform acts comprising: receiving user input directed to manipulating two or more pieces of visual content associated with at least one application, the two or more pieces of visual content being presented on a user interface (UI); determining at least two pieces of visual content that can be manipulated via the UI based at least in part on the user input and a collection of interactive content; determining individual pieces of the at least two pieces of visual content to perform manipulations based at least in part on the collection of interactive content; and presenting a result of the manipulations of the two or more pieces of visual content on the UI.

R. One or more computer-readable media as paragraph Q wherein the collection of interactive content includes a tree of interactive content and determining the individual pieces of the at least two pieces of visual content to perform the manipulations comprises: traversing the tree of interactive content, starting at a parent node associated with the at least one application and continuing to one or more child nodes associated with the parent node; determining the manipulations that the at least two pieces of visual content are capable of performing; and determining prohibited manipulations that the one or more child nodes are not permitted to perform based on restrictions from the parent node.

S. One or more computer-readable media as paragraph R recites, wherein the determining the individual pieces of the at least two pieces of visual content to perform the manipulations further comprises: traversing the tree of interactive content in reverse order, starting at the one or more child nodes and continuing to the parent node; based on the determining the manipulations that each of the child nodes can perform, performing the manipulations that each of the child nodes can perform at the child nodes; and passing any remaining manipulations to other nodes of the tree of interactive content for performing.

T. One or more computer-readable media as any one of paragraphs Q or S recites, wherein the each of the two or more pieces of visual content is associated with different applications

What is claimed is:

1. A computer-implemented method comprising:
    collecting information about content available for manipulation via a graphical user interface in an interactive content storage comprising a tree of interactive content;
    receiving input via the graphical user interface, the input directed to at least two content items of the tree of interactive content that are presented via the graphical user interface, the at least two content items including:
        a first content item of the at least two content items associated with a first application running in a first process; and
        a second content item of the at least two content items associated with a second application running in a second process;
    identifying the first content item and the second content item in the interactive content storage based on an initial hit-test procedure, the initial hit-test procedure includes determining whether at least one of geometries or point values of the input fall within a rendered content of each of the first content item and the second content item;
    determining, based at least in part on identifying the first content item and the second content item in the interactive content storage, manipulations that are available for the first content item and the second content item, wherein determining the manipulations that are available includes:
        determining a chain of interactive content based on the initial hit-test procedure; and
        identifying the chain of interactive content in the tree of interactive content to determine how the first content item and the second content item are manipulated; and
    causing, based at least in part on the input and the manipulations, the first content item and the second content item to be manipulated substantially simultaneously in the graphical user interface.

2. The computer-implemented method of claim 1, wherein the tree of interactive content includes
    information about interactions available for individual content items of the content; and
    information about interactive relationships between the individual content items.

3. The computer-implemented method of claim 2, wherein: the input comprises touch input and the touch input includes two or more points of contact.

4. The computer-implemented method of claim 2 further comprising:
    receiving a new input via the graphical user interface; and
    causing manipulation of corresponding content items based at least in part on the new input and the tree of interactive content.

5. The computer-implemented method of claim 1, wherein the input includes two inputs via the graphical user interface at a same time or within a threshold amount of time.

6. A system comprising:
    a graphical user interface;
    an interactive content storage including a tree of interactive content corresponding to information associated with a plurality of content items that are available for manipulations via the graphical user interface;
    one or more processors; and
    computer-readable media storing at least a manipulator module and two or more applications that are executable by the one or more processors to cause the system to perform operations comprising:

receiving input via the graphical user interface, the input directed to at least two content items of the tree of interactive content that are presented via the graphical user interface, the at least two content items including:
- a first content item of the at least two content items associated with a first application of the two or more applications running in a first process and
- a second content item of the at least two content items associated with a second application of the two or more applications running in a second process;

identifying the first content item and the second content item in the interactive content storage based on an initial hit-test procedure, the initial hit-test procedure includes determining whether at least one of geometries or point values of the input fall within a rendered content of each of the first content item and the second content item;

determining, based at least in part on identifying the first content item and the second content item in the interactive content storage, manipulations that are available for the first content item and the second content item, wherein determining the manipulations that are available includes:
- determining a chain of interactive content based on the initial hit-test procedure; and
- identifying the chain of interactive content in the tree of interactive content to determine how the first content item and the second content item are manipulated; and causing, based at least in part on the input and the manipulations, the first content item and the second content item to be manipulated substantially simultaneously in the graphical user interface.

7. The system of claim 6, wherein determining the manipulations is based at least in part on a type of gesture associated with the input.

8. The system of claim 6, wherein determining the manipulations is based at least in part on a current state of the input.

9. The system of claim 6, wherein the input includes two inputs via the graphical user interface at a same time or within a threshold amount of time.

10. The system of claim 6, wherein the tree of interactive content includes
- information about interactions available for individual content items; and
- information about interactive relationships between the individual content items.

11. The system of claim 10, wherein determining the manipulations is based at least in part on traversing the tree of interactive content associated with the interactive content storage.

12. The system of claim 11, wherein traversing the tree of interactive content comprises starting at parent nodes associated with the two or more applications and continuing to child nodes associated with the first content item and the second content item.

13. One or more computer-readable storage media storing instructions that are executable by the one or more processors to perform operations comprising:

collecting information about content available for manipulation via a graphical user interface in an interactive content storage comprising a tree of interactive content;

receiving input via a graphical user interface, the input directed to at least two content items of the tree of interactive content presented via the graphical user interface, the at least two content items including:
- a first content item of the at least two content items associated with a first application running in a first process; and
- a second content item of the at least two content items associated with a second application running in a second process;

identifying the first content item and the second content item in the interactive content storage based on an initial hit-test procedure, the initial hit-test procedure includes determining whether at least one of geometries or point values of the input fall within a rendered content of each of the first content item and the second content item;

determining, based at least in part on identifying the first content item and the second content item in the interactive content storage, manipulations that are available for the first content item and the second content item, wherein determining the manipulations that are available includes:
- determining a chain of interactive content based on the initial hit-test procedure; and
- identifying the chain of interactive content in the tree of interactive content to determine how the first content item and the second content item are manipulated; and causing, based at least in part on the input and the manipulations, the first content item and the second content item to be manipulated substantially simultaneously in the graphical user interface.

14. The one or more computer-readable storage media of claim 13, wherein determining the manipulations is based at least in part on a type of gesture associated with the input.

15. The one or more computer-readable storage media of claim 13, wherein determining the manipulations is based at least in part on a current state of the input.

16. The one or more computer-readable storage media of claim 13, the operations further comprising:
- collecting information about content available for manipulation via the graphical user interface; and
- storing the information in the interactive content storage.

17. The one or more computer-readable storage media of claim 13, wherein the tree of interactive content includes
- information about interactions available for individual content items of the content; and
- information about interactive relationships between the individual content items.

18. The one or more computer-readable storage media of claim 17, wherein determining the manipulations is based at least in part on traversing the tree of interactive content associated with the interactive content storage.

19. The one or more computer-readable storage media of claim 17, wherein traversing the tree of interactive content comprises starting at parent nodes associated with the two or more applications and continuing to child nodes associated with the first content item and the second content item.

* * * * *